(12) United States Patent
Hayashi et al.

(10) Patent No.: US 10,775,541 B2
(45) Date of Patent: Sep. 15, 2020

(54) OPTICAL-FIBER OUTPUT BEAM PROFILE MEASUREMENT METHOD AND OPTICAL-FIBER OUTPUT BEAM PROFILE MEASUREMENT APPARATUS

(71) Applicant: SUMITOMO ELECTRIC INDUSTRIES, LTD., Osaka-shi, Osaka (JP)

(72) Inventors: Tetsuya Hayashi, Osaka (JP); Takuji Nagashima, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 129 days.

(21) Appl. No.: 16/026,206

(22) Filed: Jul. 3, 2018

(65) Prior Publication Data
US 2019/0011623 A1    Jan. 10, 2019

(30) Foreign Application Priority Data
Jul. 6, 2017 (JP) ................................ 2017-132561

(51) Int. Cl.
| | |
|---|---|
| F21V 8/00 | (2006.01) |
| G02B 6/42 | (2006.01) |
| G02B 6/02 | (2006.01) |
| G01M 11/00 | (2006.01) |

(52) U.S. Cl.
CPC ........... *G02B 6/0006* (2013.01); *G01M 11/33* (2013.01); *G02B 6/0008* (2013.01); *G02B 6/02042* (2013.01); *G02B 6/4215* (2013.01)

(58) Field of Classification Search
CPC ............ G01B 26/0006; G01B 26/0008; G01B 26/02042; G01B 26/4215; G01M 11/33
See application file for complete search history.

(56) References Cited

U.S. PATENT DOCUMENTS

| | | | |
|---|---|---|---|
| 2015/0139638 A1* | 5/2015 | Ma ........................ | G02B 6/3801 398/16 |
| 2016/0187577 A1* | 6/2016 | Sasaki .................. | G02B 6/0288 385/126 |

OTHER PUBLICATIONS

Tetsuya Hayashi et al., "Coupled-Core Multi-Core Fibers: High-Spatial-Density Optical Transmission Fibers with Low Differential Modal Properties," ECOC 2015, We 1.4.1.
(Continued)

*Primary Examiner* — Dominic J Bologna
(74) *Attorney, Agent, or Firm* — Faegre Drinker Biddle & Reath LLP (57) ABSTRACT

A method and an apparatus for measuring a profile of a beam output from a randomly-coupled multi-core fiber are provided. An apparatus includes a light source, a measurement unit, and an analysis unit. Light output from the light source is input in one or more of a plurality of spatial modes of the fiber at an input end of the fiber. The measurement unit measures a sum of intensity profiles of individual light components output from respective ones of the plurality of spatial modes by averaging a component of interference between the plurality of spatial modes in a beam profile of combined light output from the plurality of spatial modes at an output end of the fiber. The analysis unit calculates an MFD and/or $A_{\it{eff}}$ of the fiber based on the sum of the intensity profiles of the individual light components obtained by the measurement unit.

20 Claims, 10 Drawing Sheets

(56) References Cited

OTHER PUBLICATIONS

Taiji Sakamoto et al., "Fiber Twisting- and Bending-Induced Adiabatic/Nonadiabatic Super-Mode Transition in Coupled Multicore Fiber," Journal of Lightwave Technology, 2016, pp. 1228-1237, vol. 34, No. 4.

Tetsuya Hayashi, "Record-Low Spatial Mode Dispersion and Ultra-Low Loss Coupled Multi-Core Fiber for Ultra-Long-Haul Transmission,", Journal of Lighwave Technology, 2017, pp. 450-457, vol. 35, No. 3.

Rob Billington, Effective Area of Optical Fibres—Definition and Measurement Techniques, National Physical Laboratory (NPL), pp. 1-19.

Recommendation G.650.1 of Telecommunication Standarization Sector of International Telecommunication Union (ITU-T), Definitions and test methods for linear, deterministic attributes of single-mode fibre and cable, 2010, pp. 1-68.

\* cited by examiner

[NFP AT 0.0 s]

[NFP AT 0.5 s]

[NFP AT 1.0 s]

[NFP AT 1.5 s]

OPTICAL-FIBER OUTPUT BEAM PROFILE MEASUREMENT METHOD AND OPTICAL-FIBER OUTPUT BEAM PROFILE MEASUREMENT APPARATUS

BACKGROUND OF THE INVENTION

Field of the Invention

The present invention relates to a method and an apparatus for measuring a profile of a beam output from a multi-core fiber having a plurality of spatial modes that are randomly coupled.

Description of the Related Art

Space-division-multiplexing optical fibers, which are optical fibers having multiple spatial modes (multiple cores and/or multiple guided modes), are advantageous in that the spatial density of transmitted information can be increased, and are therefore attractive as a technology for achieving efficient use of transmission paths with limited areas, such as underground conduits and submarine cables.

In particular, a coupled multi-core fiber (C-MCF), in which guided modes are mutually coupled in a plurality of cores, includes cores arranged with small distances therebetween, and is therefore effective in increasing the spatial density of transmitted information. Accordingly, the C-MCF enables high-density, high-capacity signal transmission when used in combination with a multi-input multi-output (MIMO) signal processing technology for distinguishing between signals in a plurality of guided modes transmitted through the coupled cores.

A randomly-coupled multi-core fiber (RC-MCF) is an example of a C-MCF in which a coupling strength between the cores is appropriately set so that random mode coupling occurs due to bending and twisting of the optical fiber. Accordingly, the rate of accumulation of differential mode delay (DMD) between the modes can be reduced to the square root of the fiber length. Therefore, the amount and cost of calculation in MIMO signal processing can be reduced by using the RC-MCF. Examples of RC-MCFs are described in Tetsuya Hayashi et al., "Coupled-Core Multi-Core Fibers: High-Spatial-Density Optical Transmission Fibers with Low Differential Modal Properties," ECOC 2015, We. 1.4.1 (2015), Taiji Sakamoto et al., "Fiber Twisting- and Bending-Induced Adiabatic/Nonadiabatic Super-Mode Transition in Coupled Multicore Fiber," J. OF LIGHTWAVE TECHNOLOGY, Vol. 34, No. 4, pp. 1228-1237 (2016), and Tetsuya Hayashi et al., "Record-Low Spatial Mode Dispersion and Ultra-Low Loss Coupled Multi-Core Fiber for Ultra-Long-Haul Transmission," J. OF LIGHTWAVE TECHNOLOGY, Vol. 35, No. 3, pp. 450-457 (2017). A typical RC-MCF has an inter-core mode coupling coefficient of 1 [1/m] or greater or an inter-core power coupling coefficient of 10 [1/km] or greater.

Compared to single-core optical fibers, which are currently in widespread use, RC-MCFs are more important not only in that the cores have a higher spatial density, but also in that optical nonlinearity is reduced because light is dispersed among the cores due to mode coupling. Since nonlinearity is reduced, RC-MCFs cause less optical noise that is generated as a result of nonlinear interference when high-intensity light is propagated.

SUMMARY OF THE INVENTION

An object of the present invention is to provide a method and an apparatus for measuring a profile of a beam output from an RC-MCF.

A method for measuring a profile of a beam output from an optical fiber, which is an RC-MCF, according to the present invention includes a measurement step and an analysis step. In the measurement step, light output from a light source is input in one or more of a plurality of spatial modes of the optical fiber at an input end of the optical fiber, and a sum of intensity profiles of individual light components output from respective ones of the plurality of spatial modes is measured by averaging a component of interference between the plurality of spatial modes in a beam profile of combined light output from the plurality of spatial modes at an output end of the optical fiber. In the analysis step, an output beam evaluation index of the optical fiber is calculated based on the sum of the intensity profiles.

In one embodiment, the measurement step may include measuring an a near field pattern (NFP) as the sum of the intensity profiles and, the analysis step may include calculating an average beam evaluation index of all supermodes based on the measured NFP and the assumption that the measured NFP is an average NFP of beams output from the individual supermodes. In another embodiment, the measuring step may include measuring an NFP as the sum of the intensity profiles and, the analysis step may include calculating a beam evaluation index of each of cores included in regions divided from each other so that each region includes one of the cores based on the measured NFP and an assumption that the measured NFP is an NFP of each of the cores. In another embodiment, the measurement step may include measuring a far field pattern (FFP) as the sum of the intensity profiles and, the analysis step may include calculating an average beam evaluation index of all cores based on the measured FFP and an assumption that the measured FFP is an average FFP of beams output from the individual cores.

In another aspect of the method according to the present invention, the measurement step may include determining a wavelength average of the beam profile to average the component of interference between the plurality of spatial modes in the beam profile of the combined light output from the plurality of spatial modes.

In the aspect, the measurement step may include determining a wavelength average of the beam profile to average the component of interference between the plurality of spatial modes in the beam profile of the combined light output from the plurality of spatial modes while adjusting a linewidth $\Delta f$ of the light source or a length or bending radius of the optical fiber so that the product $\tau \cdot \Delta f$ of a mode dispersion $\tau$ of the optical fiber and a linewidth $\Delta f$ is 9 or greater.

In yet another aspect of the method according to the present invention, the measurement step may include inputting mutually uncorrelated light components from the light source in all of the plurality of spatial modes individually at the input end of the optical fiber and averaging the component of interference between the plurality of spatial modes in the beam profile of the combined light output from the plurality of spatial modes.

In the aspect, the measurement step may include individually outputting the mutually uncorrelated light components from a plurality of light emitting elements that operate independently of each other. Alternatively, the measurement step may include dividing light output from a single light emitting element and having a linewidth $\Delta f$ into light components to be input in the respective spatial modes of the optical fiber and applying delays that differ from each other by $1.1/\Delta f$ or more.

Alternatively, the measurement step may include by dividing light output from a single light emitting element into light components to be input in the respective spatial modes of the optical fiber and temporally varying polarizations of the light components.

An apparatus for measuring a profile of a beam output from an optical fiber, which is an RC-MCF according to the present invention includes a light source, a measurement unit, and an analysis unit. The light source outputs light so that the light is input in one or more of a plurality of spatial modes of the optical fiber at an input end of the optical fiber. The measurement unit measures a sum of intensity profiles of individual light components output from respective ones of the plurality of spatial modes by averaging a component of interference between the plurality of spatial modes in a beam profile of combined light output from the plurality of spatial modes at an output end of the optical fiber. The analysis unit that calculates an output beam evaluation index of the optical fiber based on the sum of the intensity profiles.

In one embodiment, the measurement unit may measure an NFP as the sum of the intensity profiles, and the analysis unit may calculate an average beam evaluation index of all supermodes based on the NFP and an assumption that the measured NFP is an average NFP of beams output from the individual supermodes. In another embodiment, the measurement unit may measure an NFP as the sum of the intensity profiles, and the analysis unit may calculate the beam evaluation index of each of cores included in regions divided from each other so that each region includes one of the cores based on the NFP and an assumption that the measured NFP is an NFP of each of the cores. In another embodiment, the measurement unit may measure an FFP as the sum of the intensity profiles, and the analysis unit may calculate an average beam evaluation index of all cores based on the measured FFP and an assumption that the measured FFP is an average FFP of beams output from the individual cores.

In another aspect of the apparatus according to the present invention, the measurement unit may determine a wavelength average of the beam profile to average the component of interference between the plurality of spatial modes in the beam profile of the combined light output from the plurality of spatial modes.

In the aspect, the measurement unit may determine a wavelength average of the beam profile to average the component of interference between the plurality of spatial modes in the beam profile of the combined light output from the plurality of spatial modes while adjusting a linewidth $\Delta f$ of the light source or a length or a bending radius of the optical fiber so that the product $\tau \cdot \Delta f$ of a mode dispersion $\tau$ of the optical fiber and a linewidth $\Delta f$ is 9 or greater.

In yet another aspect of the apparatus according to the present invention, the measurement unit may average the component of interference between the plurality of spatial modes in the beam profile of the combined light output from the plurality of spatial modes all of which individually receive mutually uncorrelated light components from the light source at the input end of the optical fiber.

In the aspect, the light source may include a plurality of light emitting elements that operate independently of each other and output the mutually uncorrected light components.

Alternately, the light source may be configures to divide light output from a single light emitting element and having a line width $\Delta f$ into light components to be input in the respective spatial modes of the measured optical fiber and to apply delays that differ from each other by $1.1/\Delta f$ or more.

Alternately, the light source may be configured to divide light output from a single light emitting element into light components to be input in the respective spatial modes of the measures optical fiber and to temporally vary polarizations of the light components in different patterns.

According to the present invention, a profile of a beam output from an RC-MCF can be measured. In addition, a mode field diameter (MFD) and effective area ($A_{eff}$) of each core of the RC-MCF can be determined on the basis of the result of the measurement.

DESCRIPTION OF THE PREFERRED EMBODIMENTS

An embodiment of the present invention will be described in detail with reference to the accompanying drawings. In the description referring to the drawings, the same elements are denoted by the same reference numerals, and redundant description is thus omitted. The present invention is not limited to examples described below. The present invention is defined by the scope of the claims, and is intended to include equivalents to the scope of the claims and all modifications within the scope.

It is generally important to evaluate the performance of an optical fiber. The performance of an optical fiber is determined by, for example, a transmission capacity achievable when the optical fiber is installed in an actual transmission system and splicing loss expected when the optical fiber is spliced to another optical fiber. When the performance of an optical fiber is evaluated, it is also generally important to measure the profile (electric field distribution or intensity distribution) of a beam output from a spatial mode of the optical fiber and quantify the measured profile as a performance index.

For single mode fibers (SMF), a mode field diameter (MFD) and an effective area ($A_{eff}$) are important performance indices. The MFD is an index related to splicing loss caused when optical fibers are spliced together. The splicing loss decreases as the MFD increases and as the difference in MFD between optical fibers decreases. $A_{eff}$ is an index related to nonlinearity. The power of nonlinear noise is inversely proportional to the square of $A_{eff}$. In other words, the nonlinear noise decreases as $A_{eff}$ increases.

The nonlinear noise that occurs during transmission through a single mode fiber is also affected by the intensity of signal light, bandwidth of signal light, transmission loss of the optical fiber, and chromatic dispersion of the optical fiber. However, $A_{eff}$ is a very important index in quantifying the performance of the optical fiber in terms of nonlinearity. The definitions and measurement methods of the MFD and $A_{eff}$ of an SMF are described in Rob Billington, "Effective Area of Optical Fibres—Definition and Measurement Techniques," National Physical Laboratory, and Recommendation G.650.1 of Telecommunication Standardization Sector of International Telecommunication Union (ITU-T), "Definitions and test methods for linear, deterministic attributes of single-mode fibre and cable," (2010).

A common technology for measuring the MFD and $A_{eff}$ of an SMF will now be described. Normally, an FFP of a beam output from the SMF is measured, and the MFD is calculated based on the FFP. The FFP is an electric field amplitude distribution or an intensity distribution over a hemisphere (far field (FF)) centered on an output end of the optical fiber and having a sufficiently large radius (FFP measurement distance). Theoretically, the FFP measurement distance needs to be infinite. However, according to ITU-T G.651.1, when the MFD is 2w, the diameter of an optical receiver is b, and the wavelength is $\lambda$, sufficient measurement accuracy can be ensured in actual measurement of an optical fiber if the FFP measurement distance is greater than or equal to 40 $wb/\lambda$.

Figure 1:
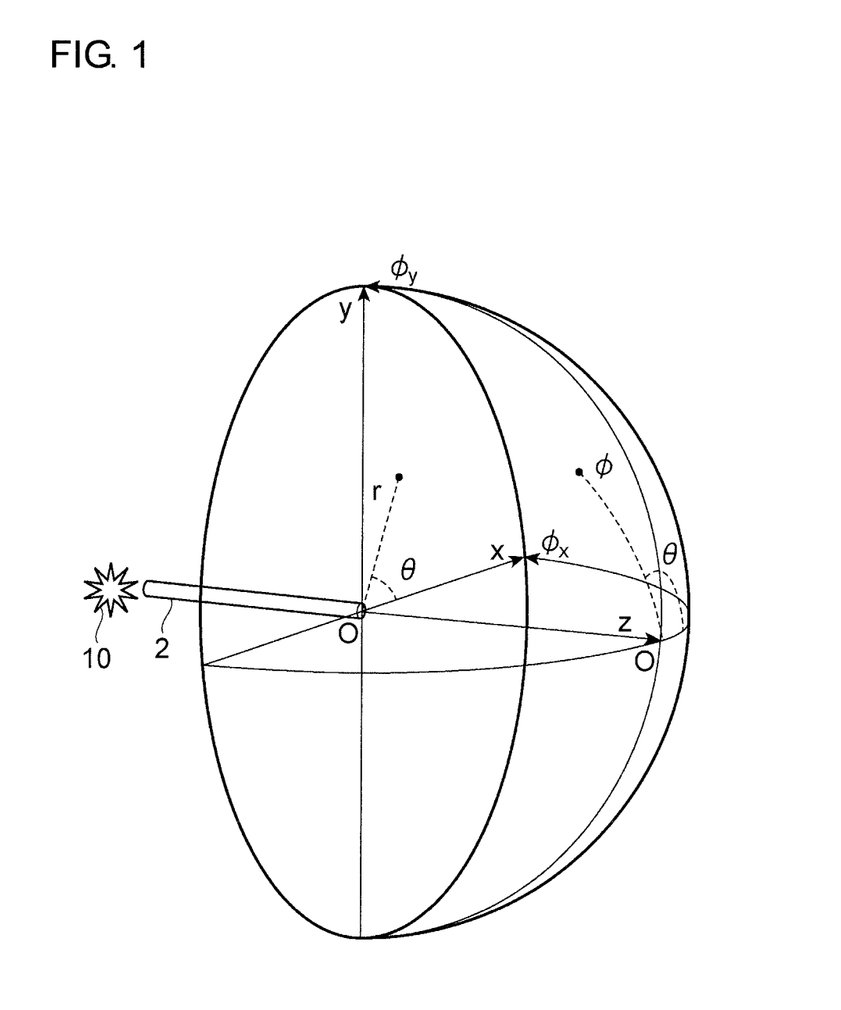
FIG. 1 is a conceptual diagram illustrating an FFP measurement system.

FIG. 1 is a conceptual diagram illustrating an FFP measurement system. A light source 10 is optically coupled to an input end of a measuring object optical fiber 2. An xy rectangular coordinate system is defined with the origin at the center of an output end of the optical fiber 2. Coordinates (x, y) are local rectangular coordinates along an end surface at the output end of the optical fiber 2. Coordinates (r,θ) are polar coordinates that correspond to the coordinates (x, y). Here, $\phi_x$ is an angle of divergence toward the FFP corresponding to the x-axis, and $\phi_y$ is an angle of divergence toward the FFP corresponding to the y-axis.

Assuming that the electric field distribution in the spatial mode of the SMF is circularly symmetric, the MFD can be calculated from Equation (1).

$$MFD = \sqrt{2}\frac{\lambda}{\pi}\left[\frac{\int_0^{\pi/2}|F_\varphi(\phi)|^2\sin\phi\cos\phi d\phi}{\int_0^{\pi/2}|F_\varphi(\phi)|^2\sin^3\phi\cos\phi d\phi}\right]^{1/2} \quad (1)$$

$F_\phi(\phi)$ is the FFP of electric field amplitude at a radiation angle (polar angle) of $\phi$. $F_\phi(\phi)$ can be regarded as the result of measurement of the FFP for $\phi$ in one dimension at any θ.

When E is the electric field amplitude distribution in a mode of an optical fiber, $A_{eff}$ is defined as in Equation (2).

$$A_{eff} = \frac{\left(\int\int |E|^2 dxdy\right)^2}{\int\int |E|^4 dxdy} \quad (2)$$

In particular, when the electric field amplitude distribution in the mode is circularly symmetrical, $A_{eff}$ can be expressed as in Equation (3).

$$A_{eff} = \frac{\left(\int_0^\infty \int_0^{2\pi} |E|^2 d\theta rdr\right)^2}{\int_0^\infty \int_0^{2\pi} |E|^4 d\theta rdr}. \quad (3)$$

Thus, $A_{eff}$ can be calculated from the intensity distribution $|E|^2$ in the mode of the optical fiber.

The electric field distribution E in the mode can be regarded as equal to the intensity distribution of an NFP of a beam output from the optical fiber. Therefore, $A_{eff}$ can be calculated from the intensity distribution of the NFP. The NFP is the electric field distribution or the intensity distribution over an output end surface (near field (NF)) of the optical fiber.

Figure 2:
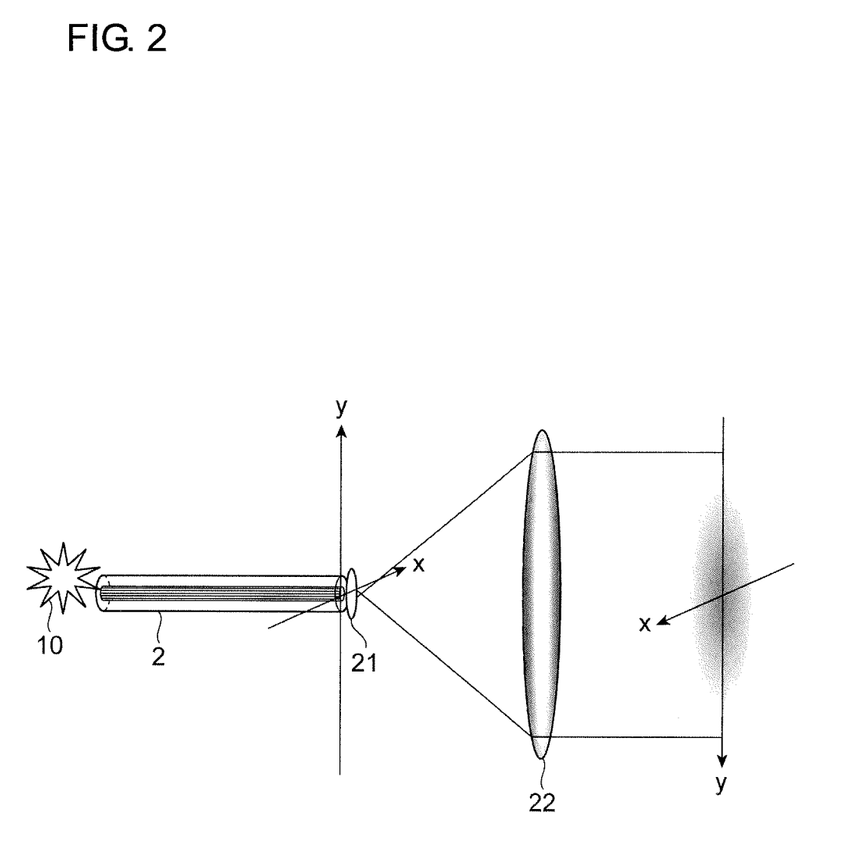
FIG. 2 is a conceptual diagram illustrating an NFP measurement system.

FIG. 2 is a conceptual diagram illustrating an NFP measurement system. The NFP of an optical fiber is very small in size, and it is therefore difficult to directly measure the NFP at high accuracy. Accordingly, the NFP is observed through a camera, for example, by using a magnifying optical system including lenses 21 and 22. However, due to the diffraction limit of the optical system and the problems regarding dynamic range and linearity of the camera, the NFP cannot be sufficiently accurately measured.

Accordingly, in actual measurement of the SMF, the FFP is accurately measured first, and then the NFP is determined from the FFP. Then, $A_{eff}$ is calculated by using the NFP. The change in the electric field amplitude from the NFP to the FFP can be explained by Fraunhofer diffraction. Therefore, assuming that the electric field distribution in the mode is circularly symmetrical, a function $E_r(r)$ of r that represents the NFP of electric field amplitude and the function $F_\phi(\phi)$ of $\phi$ that represents the FFP of electric field amplitude can be converted into each other by using the 0th-order Hankel transform as in Equation (4).

$$\begin{cases} F_\phi(\phi) \propto \int_0^\infty E_r(r)J_n(rk\sin\phi)rdr, \\ E_r(r) \propto \int_0^\infty F_\varphi(\varphi)J_n(rk\sin\phi)\sin 2\phi d\phi \end{cases} \quad (4)$$

The SMF has a single spatial mode, and the electric field distribution in the spatial mode is circularly symmetrical. Therefore, the MFD and $A_{eff}$ of the SMF can be easily and accurately measured and evaluated by the above-described method.

In contrast, an RC-MCF has a plurality of spatial modes. In addition, when light propagates through the RC-MCF, random optical coupling occurs between the spatial modes. Therefore, the MFD and $A_{eff}$ of the RC-MCF cannot be evaluated by a method similar to that for the SMF.

The MFD and $A_{eff}$ are performance indices for quantifying the electric field amplitude distribution in each mode of the optical fiber. Therefore, to evaluate the MFD and $A_{eff}$ of the RC-MCF, the NFP and FFP need to be measured while light is output from only one of the modes that is to be evaluated. However, random optical coupling occurs between the spatial modes, and the manner in which the coupling occurs varies over time.

Figure 3:
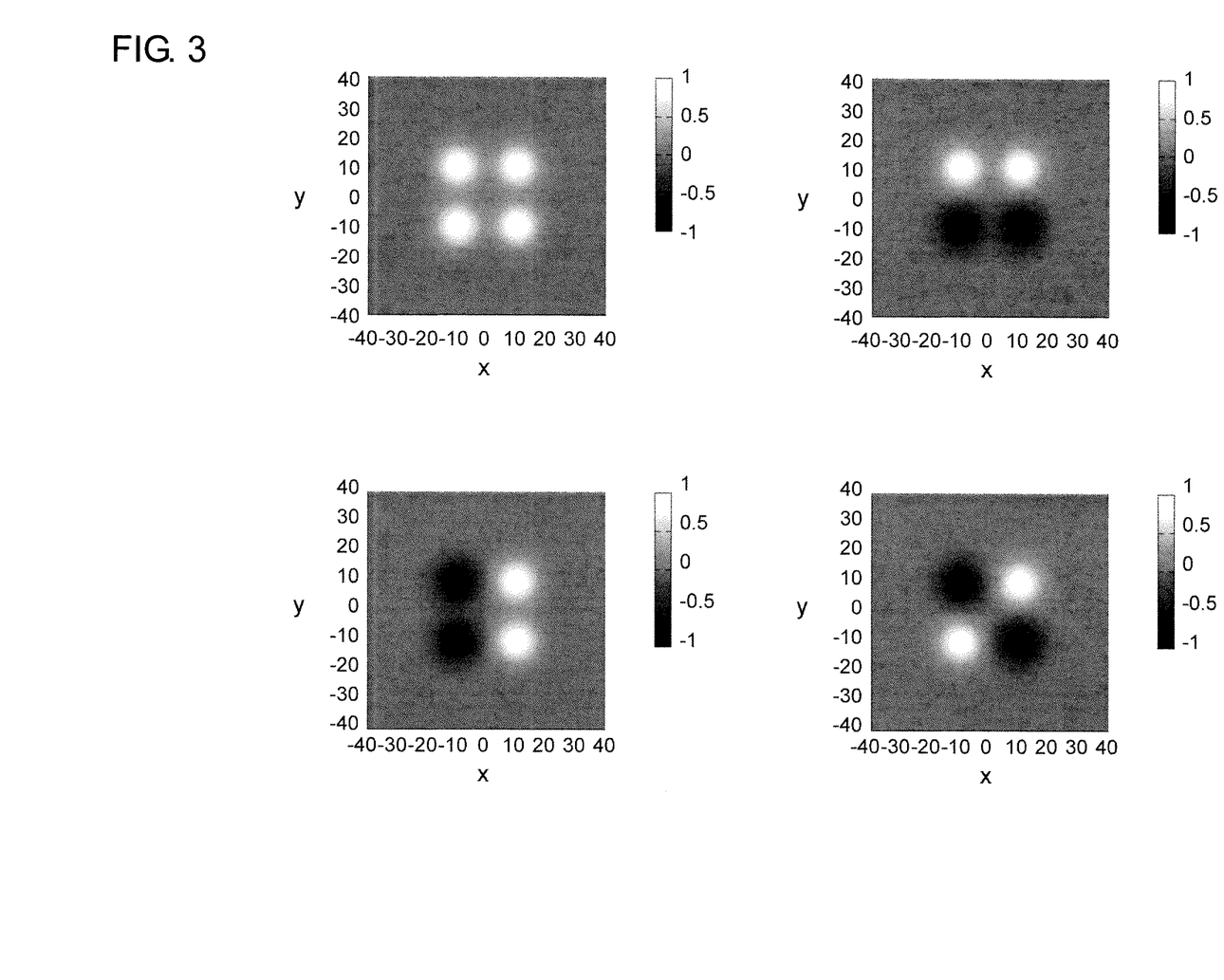
FIG. 3 shows examples of electric field distributions of NFPs of an RC-MCF.
Figure 4:
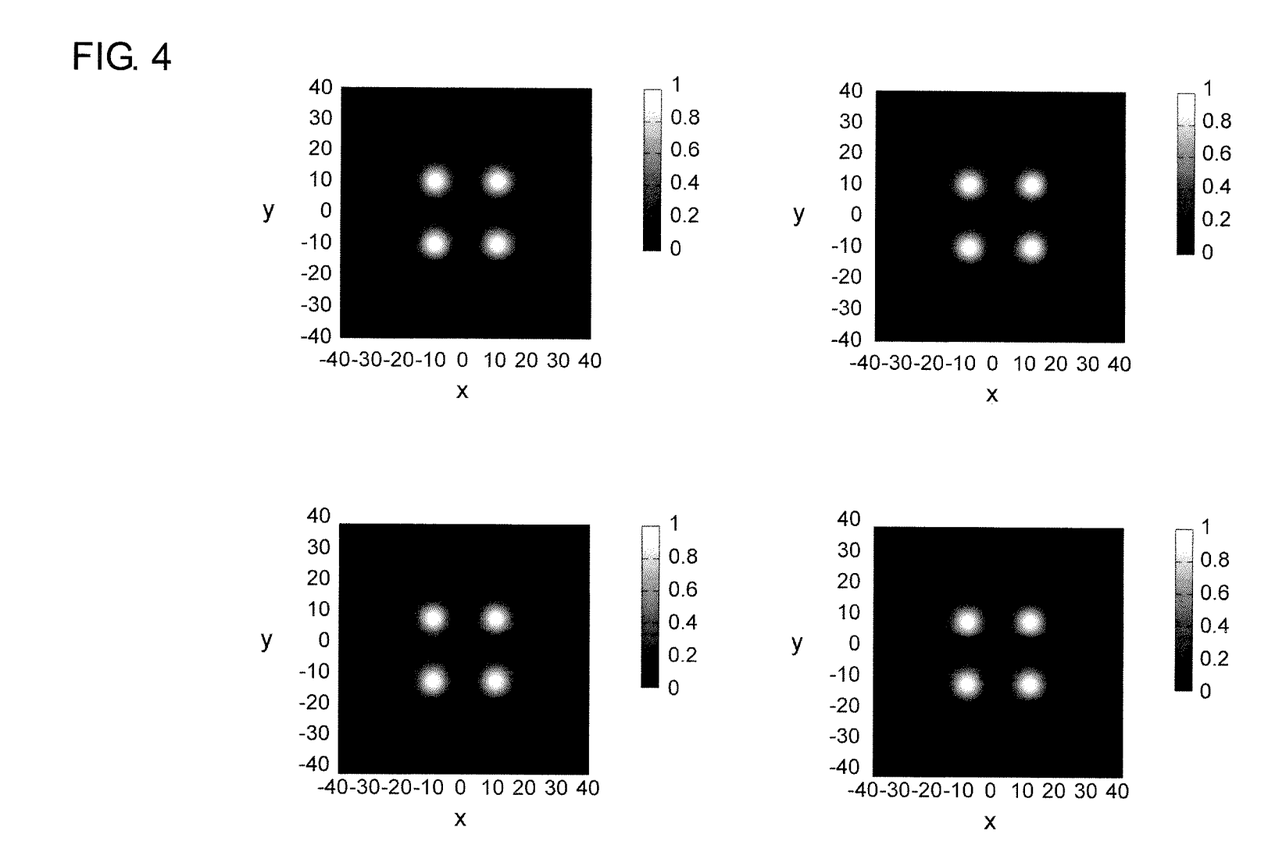
FIG. 4 shows examples of intensity distributions of NFPs of the RC-MCF.

For example, spatial modes of four cores coupled in an RC-MCF serve as so-called supermodes. The supermodes spread over all of the cores. FIG. 3 shows examples of electric field distributions of NFPs of the RC-MCF. FIG. 4 shows examples of intensity distributions of NFPs of the RC-MCF. The RC-MCF used herein includes four cores arranged in a square pattern so that the center-to-center distance between the cores is 20 μm. The MFD of each individual core is about 10 μm. There is very little difference in intensity distribution of NFP between the spatial modes.

Figure 5:
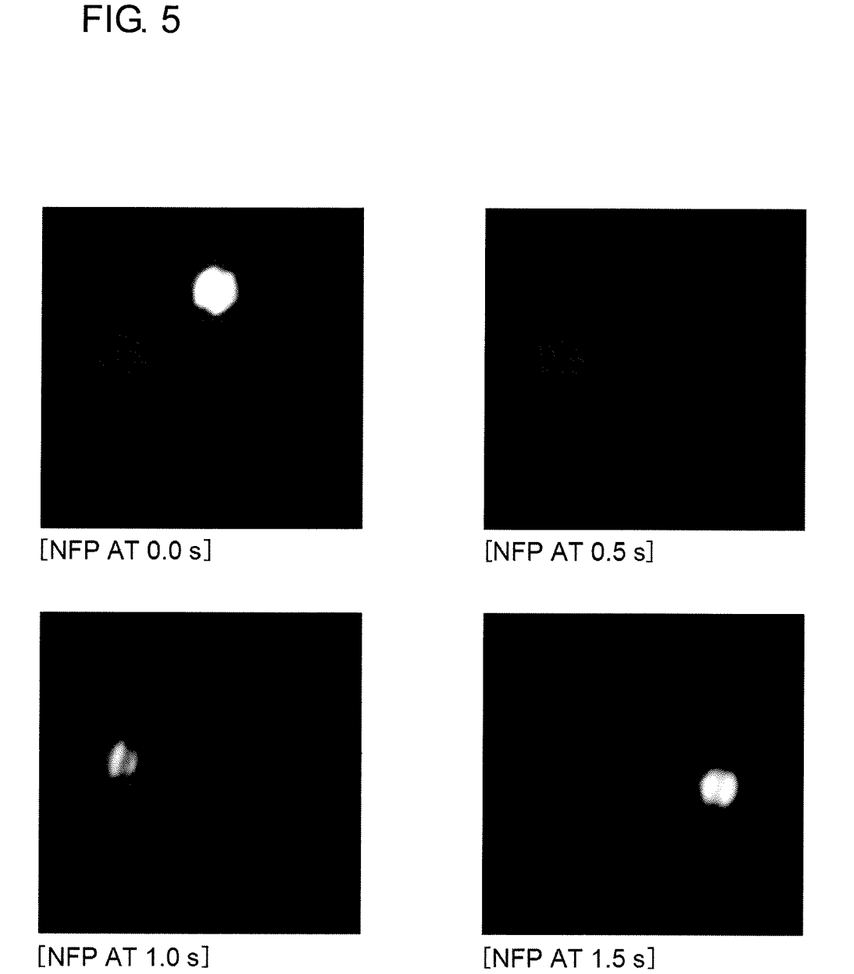
FIG. 5 shows intensity distributions of NFPs of the RC-MCF measured at intervals of 0.5 seconds, illustrating an example of variation over time.

The profile of a beam output from the RC-MCF needs to be measured while light is output from only one of the spatial modes. However, the intensity of the NFP of light output from an actual RC-MCF having a similar design varies over time. FIG. 5 shows intensity distributions of NFPs of the RC-MCF measured at intervals of 0.5 seconds, illustrating an example of variation over time. The cores do not output light components having equivalent intensities as illustrated in FIG. 4. This shows that light components in a plurality of modes are output in a randomly mixed manner.

An optical-fiber output beam profile measurement method and an optical-fiber output beam profile measurement apparatus according to the present embodiment described below enable measurement of a profile of a beam output from the RC-MCF. The MFD and $A_{eff}$ of each core of the RC-MCF can be determined based on the measurement result.

When all of the modes of the RC-MCF are excited, the intensity $I_{NFP}$ of the NFP can be expressed as in Equation (5).

$$I_{NFP}(x, y) = \left| \sum_n E_n(x, y) \right|^2 \quad (5)$$

$$= \left[ \sum_n E_n(x, y) \right] \left[ \sum_n E_n^*(x, y) \right]$$

$$= \sum_n |E_n(x, y)|^2 + 2\text{Re}\left[ \sum_{n \neq m} E_n(x, y) E_m^*(x, y) \right]$$

$$= \sum_n I_{NFP,n}(x, y) + 2\text{Re}\left[ \sum_{n \neq m} E_n(x, y) E_m^*(x, y) \right]$$

$E_n$ is the profile of the complex amplitude of the electric field in the NF in mode n, and $E_n^*$ is the complex conjugate of $E_n$. Re[x] is the real part of complex number x. $I_{NFP, n}$ represents the profile of the electric field intensity in the NF in mode n.

Similarly, when all of the modes of the RC-MCF are excited, the intensity $I_{FFP}$ of the FFP can be expressed as in Equation (6).

$$I_{FFP}(\varphi_x, \varphi_y) = \left| \sum_n F_n(\varphi_x, \varphi_y) \right|^2 \quad (6)$$

$$= \left[ \sum_n F_n(\varphi_x, \varphi_y) \right] \left[ \sum_m F_m^*(\varphi_x, \varphi_y) \right]$$

$$= \sum_n |F_n(\varphi_x, \varphi_y)|^2 + 2\text{Re}\left[ \sum_{n \neq m} F_n(\varphi_x, \varphi_y) F_m^*(\varphi_x, \varphi_y) \right]$$

$$= \sum_n I_{FFP,n}(\varphi_x, \varphi_y) + 2\text{Re}\left[ \sum_{n \neq m} F_n(\varphi_x, \varphi_y) F_m^*(\varphi_x, \varphi_y) \right]$$

$F_n$ is the profile of the complex amplitude of the electric field in the FF in mode n, and $F_n^*$ is the complex conjugate of $F_n$. $I_{FFP, n}$ represents the profile of the electric field intensity in the FF in mode n.

Random variation in, for example, the phase relationship between the modes of the RC-MCF leads to random variation in a component of variation in light intensity caused by inter-mode interference (interference component), which is represented by the second term on the right side in the last line of each of Equation (5) for the NF and Equation (6) for the FE As a result, reliable measurement cannot be performed.

Accordingly, by sufficiently averaging the interference component so that the interference component approaches 0, Equation (5) can be rewritten as Equation (7).

$$I_{NFP}(x, y) \cong \sum_n I_{NFP,n}(x, y) \quad (7)$$

Similarly, Equation (6) can be rewritten as Equation (8).

$$I_{FFP}(\varphi_x, \varphi_y) \cong \sum_n I_{FFP,n}(\varphi_x, \varphi_y) \quad (8)$$

Thus, $I_{NFP}$ and $I_{FFP}$ can be reliably measured.

Figure 6:
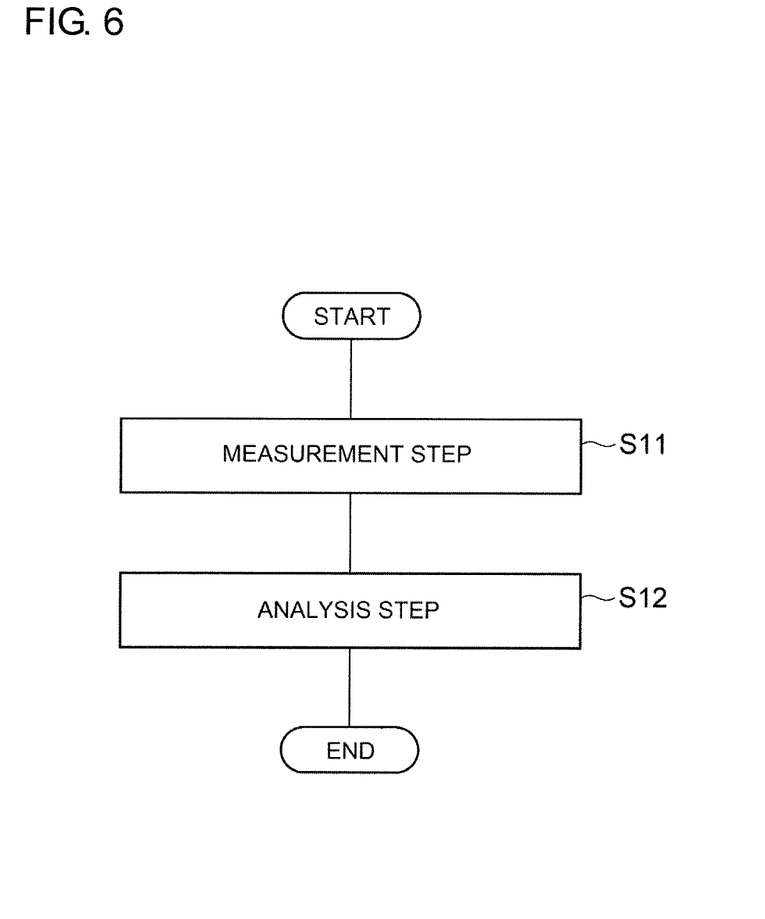
FIG. 6 is a flowchart of an optical-fiber output beam profile measurement method according to an embodiment.
Figure 7:
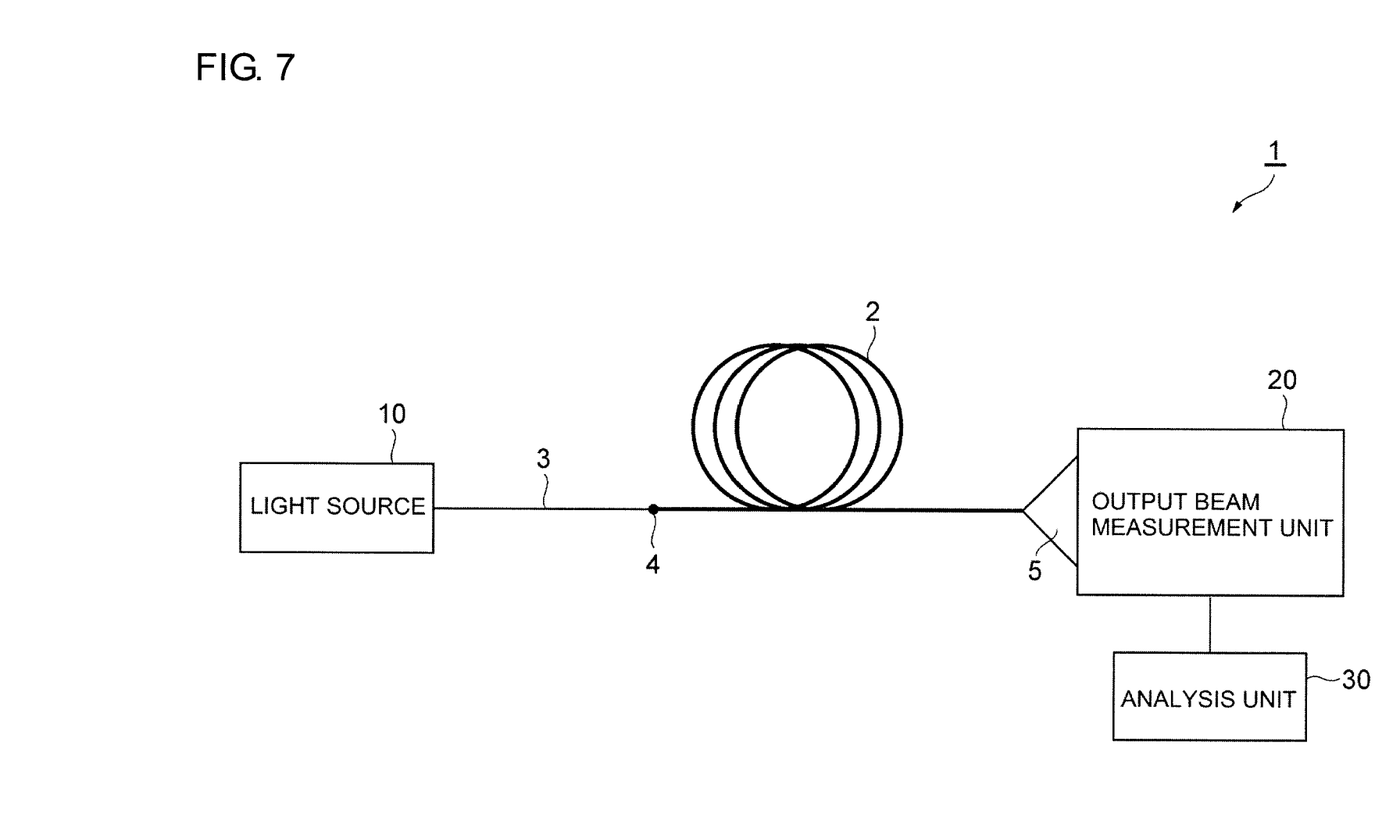
FIG. 7 is a conceptual diagram illustrating an example of the structure of an optical-fiber output beam profile measurement apparatus according to the embodiment.

To realize such a measurement, the optical-fiber output beam profile measurement method and the optical-fiber output beam profile measurement apparatus according to the present embodiment are configured as described below. FIG. 6 is a flowchart of the optical-fiber output beam profile measurement method according to the present embodiment. FIG. 7 is a conceptual diagram illustrating an example of the structure of an optical-fiber output beam profile measurement apparatus 1 according to the present embodiment.

The optical-fiber output beam profile measurement apparatus 1 includes the light source 10, a measurement unit 20, and an analysis unit 30. The optical fiber 2 is an RC-MCF. An input optical fiber 3 is provided to optically couple the light source 10 to the optical fiber 2, and may be an SMF. A first end of the input optical fiber 3 is optically connected to the light source 10, and a second end of the input optical fiber 3 is optically connected to the input end of the optical fiber 2 at a connecting point 4. The measurement unit 20 receives light 5 output from the output end of the optical fiber 2.

In measurement step S11, the light source 10 outputs measurement light. The light output from the light source 10 is guided through the input optical fiber 3, and is input to the optical fiber 2, which is an RC-MCF, at the input end thereof in one or more of the spatial modes of the optical fiber 2. The one or more of the spatial modes of the optical fiber 2 in which the light is input are set based on an optical coupling state between the input optical fiber 3 and the optical fiber 2 at the connecting point 4. The light source 10 may include any type of light emitting element, such as a light emitting diode or a laser diode.

In measurement step S11, the measurement unit 20 measures the sum of intensity profiles of individual light components output from the respective spatial modes by averaging the component of interference between the spatial modes in the beam profile of combined light output from the plurality of spatial modes at the output end of the optical fiber 2. The measurement unit 20 may include any type of light receiving element, such as a photodiode, and a certain lens system.

In analysis step S12, the analysis unit 30 calculates output beam evaluation indices (MFD, $A_{eff}$) of the optical fiber 2 based on the result of measurement of the sum of the light intensity profiles obtained by the measurement unit 20. The analysis unit 30 may include a computing element, such as a central processing unit (CPU), and a storage element, such as a memory.

In the optical-fiber output beam profile measurement apparatus 1 according to the present embodiment and the optical-fiber output beam profile measurement method using this apparatus, the measurement unit 20 and the analysis unit 30 may be operated in three measurement modes described below. Two or more of the three measurement modes may be applied in combination.

In a first measurement mode, the measurement unit 20 measures an NFP as the sum of the intensity profiles of the individual light components output from the respective spatial modes of the optical fiber 2. Then, the analysis unit 30 calculates the average beam evaluation indices of all of the supermodes by assuming that the measured NFP is the average NFP of the beams output from the individual supermodes.

In a second measurement mode, the measurement unit 20 measures an NFP as the sum of the intensity profiles of the individual light components output from the respective spatial modes of the optical fiber 2. Then, the analysis unit 30 calculates the beam evaluation indices of each core by assuming that the measured NFP is the NFP of each of the cores included in regions divided from each other so that each region includes one of the cores.

In a third measurement mode, the measurement unit 20 measures an FFP as the sum of the intensity profiles of individual light components output from the respective spatial modes of the optical fiber 2. Then, the analysis unit 30 calculates the average beam evaluation indices of all of the cores by assuming that the measured FFP is the average FFP of the beams output from the individual cores.

Figure 8:
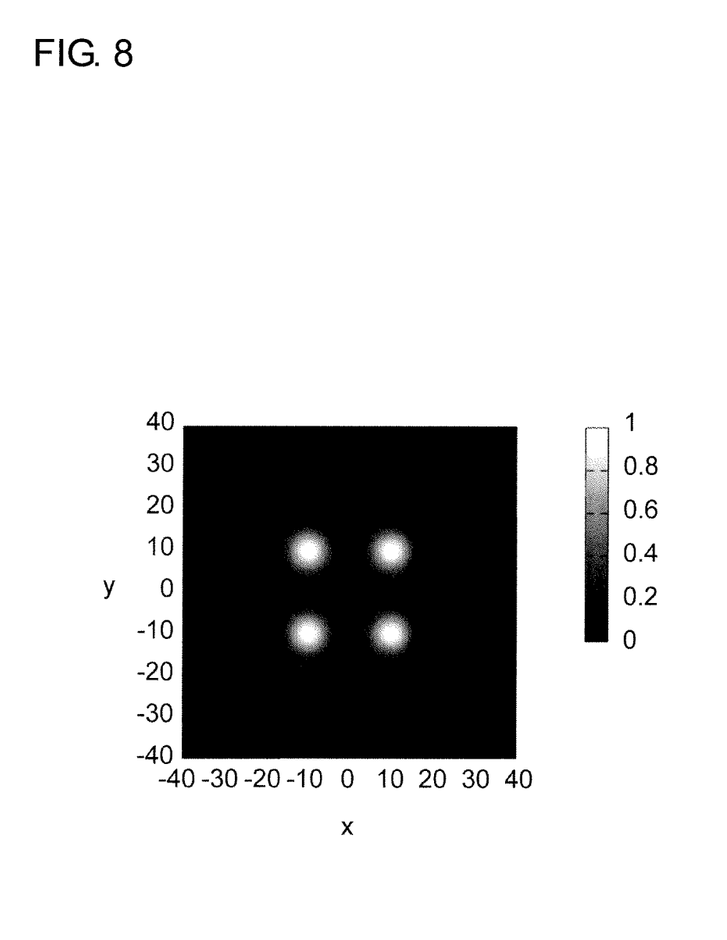
FIG. 8 illustrates an example of the average NFP of light intensity of all supermodes in the case where a measuring object optical fiber is a 4-core RC-MCF.

When the optical fiber 2 is a 4-core RC-MCF, the average NFP of light intensity of all of the supermodes is as shown in FIG. 8. When four quadrants are defined around the center of the output end of the optical fiber 2, each quadrant has a peak light intensity. Therefore, in each of the above-described first to third measurement modes, the analysis unit 30 can perform the following process.

In the first measurement mode, "$A_{eff}$" can be calculated from Equation (2) by using the intensity profile of the entire region of the four quadrants. This value is not the average $A_{eff}$ of the supermodes in a physical sense, but is "$A_{eff}$" calculated from the average NFP of the supermodes. However, "$A_{eff}$" is sufficiently reliable as an evaluation index. A value corresponding to $A_{eff}$ of each core mode can be calculated by dividing the calculated "$A_{eff}$" by the number of core modes.

In the second measurement mode, $A_{eff}$ of each core can be calculated by calculating $A_{eff}$ from Equation (2) for each of the regions of the four quadrants. In addition, $A_{eff}$ of each core can also be calculated from Equation (3) by using a polar coordinate system with the origin at, for example, the peak intensity point or the geometric center in each quadrant. Perpendicular bisectors of line segments connecting peak intensity points or geometric centers of the cores may be used as boundary lines that divide the regions of the cores from each other.

In the third measurement mode, as is clear from Equation (8), the measured FFP of intensity is the sum of the FFPs of intensity of the respective modes. In the case where each mode is regarded as the mode of each core, if the FFP measurement distance is sufficiently large, the measured FFP of intensity may simply be regarded as the sum of the FFPs of intensity of the respective cores. Unlike the NFP in which the intensity peaks appear at different positions, the FFPs of the respective cores have peaks that overlap at the position where the radiation angle is 0 degrees when the output end surface of the optical fiber 2 is perpendicular to the central axes of the cores. Therefore, the average FFP of intensity of the cores can be obtained simply by measuring the FFP of intensity. The measured FFP is the average FFP of the cores, and is, of course, circularly symmetrical. Therefore, the MFD of each core can be calculated from Equation (1). In addition, $A_{eff}$ of each core can be calculated from Equation (3) after converting the FFP into the NFP by using Equation (4).

In any of the first to third measurement modes, the measurement unit 20 measures the sum of the intensity profiles of the individual light components output from the respective spatial modes by averaging the component of interference between the spatial modes in the beam profile of the combined light output from the plurality of spatial modes at the output end of the optical fiber 2. The component of interference between the spatial modes may be averaged as described below.

The component of interference between the spatial modes in the beam profile of the combined light output from the plurality of spatial modes can be averaged by determining the wavelength average of the beam profile. For example, the light source 10 may vary the wavelength over time by using a light emitting element having a variable output light wavelength or by causing a plurality of light emitting elements having different output light wavelengths to successively emit light. In this case, the analysis unit 30 may determine the wavelength average based on beam profiles measured by the measurement unit 20 for the respective wavelengths. Alternatively, the light source 10 may include a light emitting element that outputs wide-wavelength-band light (for example, a super-luminescent diode (SLD)). In this case, the analysis unit 30 may determine the time average of the beam profile measured by the measurement unit 20.

Alternatively, the component of interference between the spatial modes in the beam profile of the combined light output from the plurality of spatial modes can also be averaged by inputting mutually uncorrelated light components from the light source 10 in all of the spatial modes individually at the input end of the optical fiber 2. In this case, the light source 10 may use light components individually output from a plurality of light emitting elements that operate independently of each other to input mutually uncorrelated light components in all of the spatial modes individually at the input end of the optical fiber 2. Alternatively, the light source 10 may divide light output from a single light emitting element into light components to be input in the respective spatial modes, and temporally vary the polarizations of the light components to be input in the respective spatial modes in different patterns so that mutually uncorrelated light components are input in all of the spatial modes individually at the input end of the optical fiber 2.

The extent to which the component of interference between the spatial modes in the beam profile of the combined light output from the plurality of spatial modes at the output end of the optical fiber 2 is averaged can be evaluated based on a ratio (VAR) of the light intensity variation range to the average light intensity (variation range/average). When the mode dispersion of the optical fiber 2 is $\tau$ and the linewidth of the light source 10 is $\Delta f$, VAR depends on the product of $\tau$ and $\Delta f$.

Figure 9:
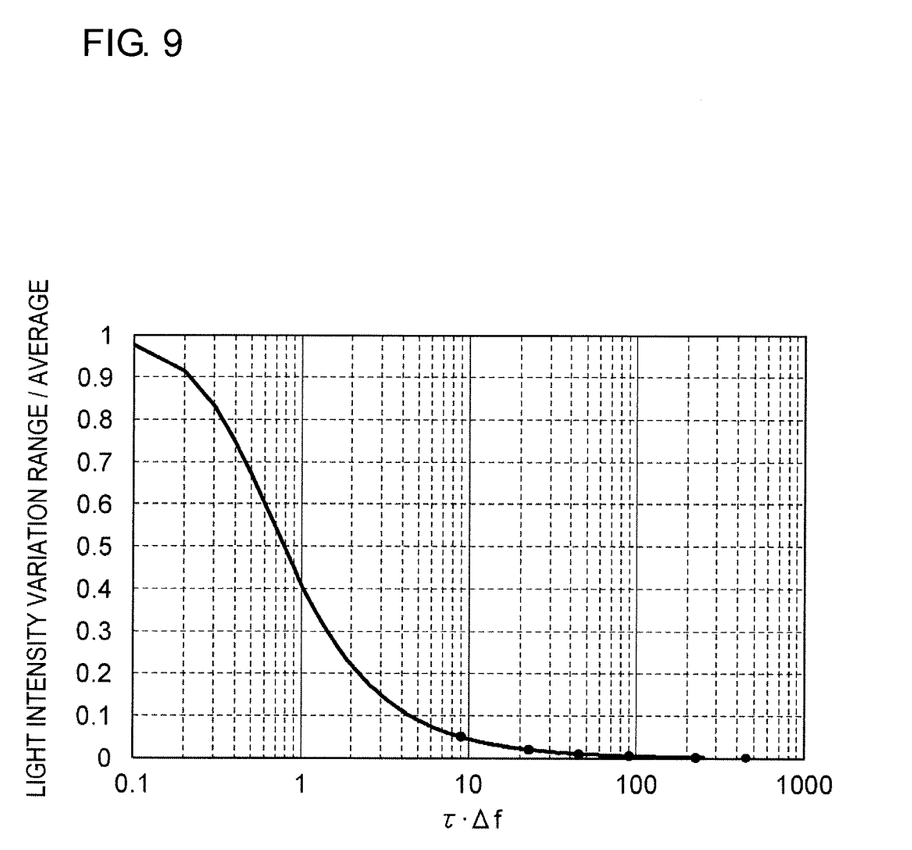
FIG. 9 is a graph showing the relationship between the ratio of the light intensity variation range to the average light intensity and $\tau \cdot \Delta f$.

FIG. 9 is a graph showing the relationship between VAR and $\tau \cdot \Delta f$ when the component of interference between the spatial modes is averaged by determining the wavelength average of the beam profile. When τ·Δf is 9 or greater, VAR is 0.05 or less. When τ·Δf is 22.5 or greater, VAR is 0.02 or less. When τ·Δf is 45 or greater, VAR is 0.01 or less. When τ·Δf is 90 or greater, VAR is 0.005 or less. When τ·Δf is 225 or greater, VAR is 0.002 or less. When τ·Δf is 450 or greater, VAR is 0.001 or less.

Therefore, the measurement is preferably performed while τ·Δf is 9 or greater by adjusting the linewidth of the light source 10 or the length or bending radius of the optical fiber 2. More preferably, the measurement is performed while τ·Δf is 22.5 or greater. More preferably, the measurement is performed while τ·Δf is 45 or greater. More preferably, the measurement is performed while τ·Δf is 90 or greater. More preferably, the measurement is performed while τ·Δf is 225 or greater. Most preferably, the measurement is performed while τ·Δf is 450 or greater.

When the component of interference between the spatial modes in the beam profile of the combined light output in the plurality of spatial modes is averaged by inputting mutually uncorrelated light components from the light source 10 in all of the spatial modes individually at the input end of the optical fiber 2, preferably, the light source 10 divides light output from a single light emitting element into light components to be input in the respective spatial modes and applies delays that differ from each other by τ or more to the light components to be input in all of the spatial modes individually.

Figure 10:
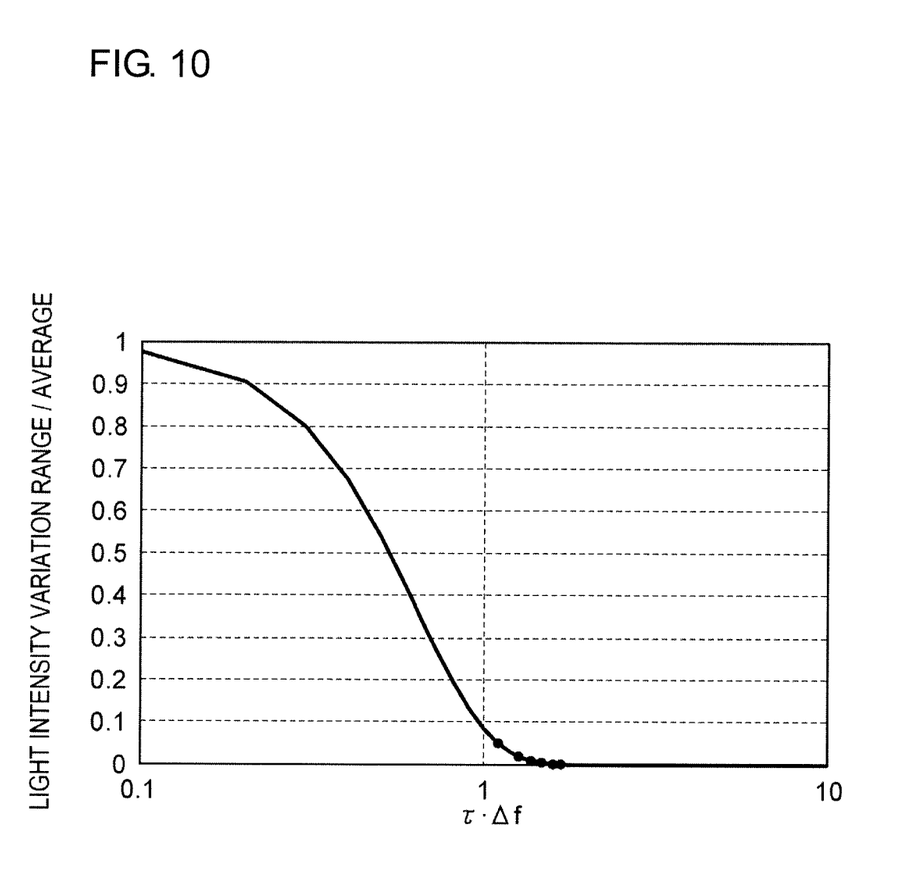
FIG. 10 is a graph showing the relationship between the ratio of the light intensity variation range to the average light intensity and $\tau \cdot \Delta f$.

FIG. 10 is a graph showing the relationship between VAR and τ·Δf in this case. When τ is 1.10/Δf or greater, VAR is 0.05 or less. When τ is 1.26/Δf or greater, VAR is 0.02 or less. When τ is 1.37/Δf or greater, VAR is 0.01 or less. When τ is 1.47/Δf or greater, VAR is 0.005 or less. When τ is 1.59/Δf or greater, VAR is 0.002 or less. When τ is 1.67/Δf or greater, VAR is 0.001 or less.

Therefore, τ is preferably 1.10/Δf or greater. More preferably, τ is 1.26/Δf or greater. More preferably, τ is 1.37/Δf or greater. More preferably, τ is 1.47/Δf or greater. More preferably, τ is 1.59/Δf or greater. Most preferably, τ is 1.67/Δf or greater.

What is claimed is:

1. A method for measuring a profile of a beam output from an optical fiber having a plurality of spatial modes that are randomly coupled, the method comprising:
   inputting light output from a light source in one or more of the plurality of spatial modes of the optical fiber at an input end of the optical fiber; measuring a sum of intensity profiles of individual light components output from respective ones of the plurality of spatial modes by averaging a component of interference between the plurality of spatial modes in a beam profile of combined light output from the plurality of spatial modes at an output end of the optical fiber; and
   calculating an output beam evaluation index of the optical fiber based on the sum of the intensity profiles.

2. The method according to claim 1, wherein
measuring the sum of intensity profiles of individual light components output from respective ones of the plurality of spatial modes includes measuring an near field pattern as the sum of the intensity profiles, and
wherein calculating the output beam evaluation index of the optical fiber based on the sum of the intensity profiles includes calculating an average beam evaluation index of all supermodes based on the measured near field pattern and an assumption that the measured near field pattern is an average near field pattern of beams output from the individual supermodes.

3. The method according to claim 1, wherein
measuring the sum of intensity profiles of individual light components output from respective ones of the plurality of spatial modes includes measuring an near field pattern as the sum of the intensity profiles, and
wherein calculating the output beam evaluation index of the optical fiber based on the sum of the intensity profiles includes calculating a beam evaluation index of each of cores included in regions divided from each other so that each region includes one of the cores based on the measured near field pattern and an assumption that the measured near field pattern is an near field pattern of each of the cores.

4. The method according to claim 1, wherein
measuring the sum of intensity profiles of individual light components output from respective ones of the plurality of spatial modes includes measuring an far field pattern as the sum of the intensity profiles, and
wherein calculating the output beam evaluation index of the optical fiber based on the sum of the intensity profiles includes calculating an average beam evaluation index of all cores based on the measured far field pattern and an assumption that the measured far field pattern is an average far field pattern of beams output from the individual cores.

5. The method according to claim 1, wherein
measuring the sum of intensity profiles of individual light components output from respective ones of the plurality of spatial modes includes determining a wavelength average of the beam profile to average the component of interference between the plurality of spatial modes in the beam profile of the combined light output from the plurality of spatial modes.

6. The method according to claim 5, wherein
measuring the sum of intensity profiles of individual light components output from respective ones of the plurality of spatial modes includes determining a wavelength average of the beam profile to average the component of interference between the plurality of spatial modes in the beam profile of the combined light output from the plurality of spatial modes while adjusting a linewidth Δf of the light source or a length or a bending radius of the optical fiber so that the product τ·Δf of a mode dispersion τ of the optical fiber and a linewidth Δf is 9 or greater.

7. The method according to claim 1, wherein
inputting light output from the light source in one or more of the plurality of spatial modes of the optical fiber at the input end of the optical fiber includes inputting mutually uncorrelated light components from the light source in all of the plurality of spatial modes individually at the input end of the optical fiber, and
wherein measuring the sum of intensity profiles of individual light components output from respective ones of the plurality of spatial modes includes averaging the component of interference between the plurality of spatial modes in the beam profile of the combined light output from the plurality of spatial modes.

8. The method according to claim 7, wherein
inputting mutually uncorrelated light components from the light source in all of the plurality of spatial modes individually at the input end of the optical fiber includes individually outputting the mutually uncorrelated light components from a plurality of light emitting elements that operate independently of each other.

9. The method according to claim 7, wherein
inputting mutually uncorrelated light components from the light source in all of the plurality of spatial modes individually at the input end of the optical fiber includes dividing light output from a single light emitting element and having a linewidth $\Delta f$ into light components to be input in the respective spatial modes of the optical fiber and applying delays that differ from each other by $1.1/\Delta f$ or more.

10. The method according to claim 7, wherein
inputting mutually uncorrelated light components from the light source in all of the plurality of spatial modes individually at the input end of the optical fiber includes dividing light output from a single light emitting element into light components to be input in the respective spatial modes of the optical fiber and temporally varying polarizations of the light components in different patterns.

11. An apparatus for measuring a profile of a beam output from an optical fiber having a plurality of spatial modes that are randomly coupled, the apparatus comprising:
a light source that outputs light so that the light is input in one or more of the plurality of spatial modes of the optical fiber at an input end of the optical fiber;
a light receiver that measures a sum of intensity profiles of individual light components output from respective ones of the plurality of spatial modes by averaging a component of interference between the plurality of spatial modes in a beam profile of combined light output from the plurality of spatial modes at an output end of the optical fiber; and
a central processing unit (CPU) having a memory with instructions stored thereon, wherein the instructions, when executed by the CPU, perform the method comprising:
calculating an output beam evaluation index of the optical fiber based on the sum of the intensity profiles.

12. The apparatus according to claim 11, wherein
the light receiver measures an near field pattern as the sum of the intensity profiles, and
wherein calculating the output beam evaluation index of the optical fiber includes calculating an average beam evaluation index of all supermodes based on the near field pattern and an assumption that the measured near field pattern is an average near field pattern of beams output from the individual supermodes.

13. The apparatus according to claim 11, wherein
the light receiver measures an near field pattern as the sum of the intensity profiles, and
wherein calculating the output beam evaluation index of the optical fiber includes calculating a beam evaluation index of each of cores included in regions divided from each other so that each region includes one of the cores based on the near field pattern and an assumption that the measured near field pattern is an near field pattern of each of the cores.

14. The apparatus according to claim 11, wherein
the light receiver measures an far field pattern as the sum of the intensity profiles, and
wherein calculating the output beam evaluation index of the optical fiber includes calculating an average beam evaluation index of all cores based on the measured far field pattern and an assumption that the measured far field pattern is an average far field pattern of beams output from the individual cores.

15. The apparatus according to claim 14, wherein
the light receiver determines a wavelength average of the beam profile to average the component of interference between the plurality of spatial modes in the beam profile of the combined light output from the plurality of spatial modes.

16. The apparatus according to claim 15, wherein
the light receiver determines a wavelength average of the beam profile to average the component of interference between the plurality of spatial modes in the beam profile of the combined light output from the plurality of spatial modes while adjusting a linewidth $\Delta f$ of the light source or a length or a bending radius of the optical fiber so that the product $\tau \cdot \Delta f$ of a mode dispersion $\tau$ of the optical fiber and a linewidth $\Delta f$ is 9 or greater.

17. The apparatus according to claim 11, wherein
the light receiver averages the component of interference between the plurality of spatial modes in the beam profile of the combined light output from the plurality of spatial modes all of which individually receive mutually uncorrelated light components from the light source at the input end of the optical fiber.

18. The apparatus according to claim 17, wherein
the light source includes a plurality of light emitting elements that operate independently of each other, and
wherein the plurality of light emitting elements and output the mutually uncorrelated light components.

19. The apparatus according to claim 17, wherein
the light source is configured to divide light output from a single light emitting element and having a linewidth $\Delta f$ into light components to be input in the respective spatial modes of the measured optical fiber, and
wherein the light source is configured to apply delays that differ from each other by $1.1/\Delta f$ or more.

20. The apparatus according to claim 17, wherein
the light source is configured to divide light output from a single light emitting element into light components to be input in the respective spatial modes of the measured optical fiber, and
wherein the light source is configured to temporally vary polarizations of the light components in different patterns.

* * * * *